(12) United States Patent
Perek et al.

(10) Patent No.: US 10,013,055 B2
(45) Date of Patent: Jul. 3, 2018

(54) EYE TRACKING USING OPTICAL FLOW

(71) Applicant: Oculus VR, LLC, Menlo Park, CA (US)

(72) Inventors: David R. Perek, Bellevue, WA (US); Warren Andrew Hunt, Woodinville, WA (US); Marshall Thomas DePue, Redmond, WA (US); Robert Dale Cavin, Kirkland, WA (US)

(73) Assignee: Oculus VR, LLC, Menlo Park, CA (US)

( * ) Notice: Subject to any disclaimer, the term of this patent is extended or adjusted under 35 U.S.C. 154(b) by 14 days.

(21) Appl. No.: 15/344,430

(22) Filed: Nov. 4, 2016

(65) Prior Publication Data

US 2017/0131765 A1 May 11, 2017

Related U.S. Application Data

(60) Provisional application No. 62/252,057, filed on Nov. 6, 2015.

(51) Int. Cl.
*G09G 5/00* (2006.01)
*G06F 3/01* (2006.01)
(Continued)

(52) U.S. Cl.
CPC ............ *G06F 3/013* (2013.01); *G02B 5/3083* (2013.01); *G02B 27/0093* (2013.01);
(Continued)

(58) Field of Classification Search
CPC ............ G02B 5/3083; G02B 2027/014; G02B 2027/0138; G02B 27/0172;
(Continued)

(56) References Cited

U.S. PATENT DOCUMENTS 8,611,015 B2* 12/2013 Wheeler ................ A61B 3/113
359/13
8,998,414 B2* 4/2015 Bohn ........................ G02B 5/20
351/210
(Continued)

FOREIGN PATENT DOCUMENTS

KR 10-2011-0116580 A 10/2011

OTHER PUBLICATIONS

PCT International Search Report and Written Opinion, PCT Application No. PCT/US2016/060718, dated Mar. 29, 2017, 15 pages.

*Primary Examiner* — Vijay Shankar
(74) *Attorney, Agent, or Firm* — Fenwick & West LLP

(57) ABSTRACT

An eye tracking system, images the surface (e.g., sclera) of each eye of a user to capture an optical flow field resulting from a texture of the imaged surface. The eye tracking system includes illumination source (e.g., laser) and a detector (e.g., camera). The source illuminates a portion of the eye that is imaged the camera. As the eye moves, different areas of the eye are imaged, allowing generation of a map of a portion of the eye. An image of a portion of the eye is includes a diffraction pattern (i.e., the optical flow) corresponding to the portion of the eye. Through a calibration process, the optical flow is mapped to a location where the eye is looking.

18 Claims, 7 Drawing Sheets

(51) Int. Cl.
*G02B 5/30* (2006.01)
*G02B 27/00* (2006.01)
*G02B 27/01* (2006.01)
*G02F 1/13* (2006.01)
*G06F 3/03* (2006.01)
*G06T 7/73* (2017.01)

(52) U.S. Cl.
CPC ........... *G02B 27/0172* (2013.01); *G02F 1/13* (2013.01); *G06F 3/0304* (2013.01); *G06T 7/74* (2017.01); *G02B 2027/014* (2013.01); *G02B 2027/0138* (2013.01); *G06T 2207/10152* (2013.01); *G06T 2207/30041* (2013.01)

(58) Field of Classification Search
CPC ... G02B 27/0093; G06F 3/0304; G06F 3/013; G06T 2207/10152
See application file for complete search history.

(56) References Cited

U.S. PATENT DOCUMENTS

| | | | |
|---|---|---|---|
| 9,459,451 B2* | 10/2016 | Saarikko | G02B 6/02085 |
| 2008/0094351 A1* | 4/2008 | Nogami | G06F 3/016 |
| | | | 345/156 |
| 2013/0077049 A1 | 3/2013 | Bohn | |
| 2013/0128364 A1 | 5/2013 | Wheeler et al. | |
| 2015/0049013 A1 | 2/2015 | Rahman et al. | |
| 2015/0185475 A1 | 7/2015 | Saarikko et al. | |

* cited by examiner

EYE TRACKING USING OPTICAL FLOW

CROSS-REFERENCE TO RELATED APPLICATIONS

This application claims priority to U.S. Provisional Application No. 62/252,057, filed Nov. 6, 2015, which is incorporated by reference in its entirety.

BACKGROUND

The present disclosure generally relates to tracking eye position of a virtual reality system user and, more particularly, to tracking eye position using a diffraction pattern of coherent light on the surface of the eye.

Virtual reality systems typically include a display panel that presents virtual reality images, which may depict elements belonging only to a virtual reality environment. The display panel may also combine real elements (e.g., tall grass in the physical world) with virtual elements (e.g., an anime animal hiding in the tall grass), as in augmented reality applications. To interact with the virtual reality system, a user makes inputs directed toward a portion of the virtual reality image. Some virtual reality systems include a dedicated peripheral to translate hand and finger movements into input signals. However, traditional peripherals artificially separate the user from the virtual environment, which prevents the user from having a fully immersive experience in the virtual environment. Eye tracking systems provide a more immersive interface than an interface predominantly reliant on a handheld peripheral. However, existing eye tracking systems are unsuitable for use in a portable, lightweight, and high-performance virtual reality headset.

BACKGROUND

A virtual reality (VR) system environment includes a VR headset configured to present content to a user via an electronic display and a VR console configured to generate content for presentation to the user and to provide the generated content to the VR headset for presentation. To improve user interaction with presented content, the VR console modifies or generates content based on a location where the user is looking, which is determined by tracking the user's eye. Accordingly, the VR headset illuminates a surface of the user's eye with a coherent light source mounted to (e.g., inside) the VR headset, such as laser.

An imaging device included in the VR headset captures light reflected by the surface of the user's eye surface. In some embodiments, light reflected from the surface of the user's eye may be polarized by a reflective light polarizer or refracted by a lens assembly that focuses or otherwise modifies light reflected from the eye surface before an imaging sensor in the imaging device receives the light reflected from the eye surface. As the surface of the eye is rough, light captured by the imaging sensor of the imaging device may be a speckle or diffraction pattern formed from a combination of light reflected from multiple portions of the surface of the user's eye.

In some embodiments, the VR headset performs one or more image processing operations to improve the contrast of an image generated from the light captured by the imaging device. Example image processing operations include sensor corrections (e.g., black-level adjustment, lens distortion correction, gamma correction) and illumination level corrections (e.g., white balance correction). The VR headset may also perform histogram equalization or any other technique to increase the contrast of the image from the captured light. In some embodiments, the VR headset may perform illumination level corrections to reduce noise caused by variable illumination of the surface of the user's eye by the electronic display or by an external light source. Alternatively or additionally, the VR console performs one or more image processing operations on images obtained by the imaging device in the VR headset and communicated from the VR headset to the VR console.

The VR headset sends eye tracking data comprising an image captured by the imaging device from the captured light or data derived from the captured image to the VR console. For example, the eye tracking data includes a version of the captured image modified through one or more image processing operations. As another example, the eye tracking data includes an image captured by image capture device and data describing lighting of the surface of the user's eye by sources other than the coherent light source. Alternatively, the VR headset includes components to track the eye of the user, so the VR headset does not send the eye tracking data to the VR console.

In some embodiments, the VR console verifies that the received eye tracking data corresponds to a valid measurement usable to accurately determine eye position. For example, the VR console determines a representative figure of merit of the eye tracking data and compares the representative figure of merit to a validity threshold. If the representative figure of merit is less than the validity threshold, the VR console determines the received eye tracking data is invalid. However, if the representative figure of merit equals or exceeds the validity threshold, the VR console verifies the received eye tracking data corresponds to a valid measurement. The representative figure of merit may be a sum, an average, a median, a range, a standard deviation, or other quantification of pixel values in image data (e.g., pixel gray levels, luminance values, relative pixel intensities). The representative figure of merit may be determined from figures of merit of all pixels in an image included in the received eye tracking data or estimated from a subset of pixels in the image included in the received eye tracking data by sampling techniques. For example, when a user blinks, a sum of the pixel intensity values decreases, so the VR console determines that the received eye tracking data is invalid in response to determining a sum of relative pixel intensities is less than the validity threshold. In various embodiments, the validity threshold is specified during manufacture of the VR headset or determined during calibration of the VR headset. When determining a figure of merit based on relative pixel intensities, indices of various pixels for which relative intensity is determined affects determination of the figure of merit in various embodiments. To account for varying external illumination conditions when verifying the validity of the received eye tracking data, the validity threshold may be dynamically determined based on a trailing average of representative figures of merit of previously received eye tracking data that was captured within a threshold time of the received eye tracking data or a trailing average of representative figures of merit of previously received eye tracking data that was captured within the threshold time of the received eye tracking data and was determined to be valid.

VR console accesses calibration data for determining an eye position from the received eye tracking data. The calibration data may include a subpixel distance indicating a distance on the surface of the user's eye corresponding to a subpixel of the image sensor of the image capture device. If a subpixel of the image sensor corresponds to a rectangular (or elliptical) area on surface of the user's eye, the calibration data may include two subpixel distances corresponding to orthogonal directions along the surface of the user's eye (e.g., a length and a width of an area on the surface of the user's eye). The subpixel distance may be determined in part from a distance between the image sensor and the surface of the user's eye. The distance between the image sensor and the surface of the user's eye may be determined during a calibration period or dynamically determined via a range finding device included in the VR headset (e.g., a laser rangefinder, sonar). In various embodiments, the VR headset periodically determines the distance between the image sensor and the surface of the user's eye (e.g., once per second), determines the distance between the image sensor and the surface of the user's eye in response to the VR headset powering on, or the distance between the image sensor and the surface of the user's eye in response to receiving measurement signals from a position sensor included in the VR headset indicating an adjustment of the VR headset on the user's head. The subpixel distance may be determined by multiplying an angle, in radians, corresponding to a pixel, which is a property of the image capture device, by the distance between the image sensor and the surface of the user's eye. Using the subpixel distance, the VR console determines a change in eye position from a subpixel shift between two images of the surface of the user's eye from received eye tracking data.

Alternatively or additionally, the VR console accesses calibration data from a table (e.g., a lookup table) comprising reference images captured during a calibration period. The reference images correspond to known eye positions, particular eye gaze points on the electronic display of the VR headset, or both. During an example calibration period, the VR headset instructs the user to gaze at a series of icons on the electronic display and captures a reference image when the user gazes at each icon. The reference image corresponds to the eye gaze point of the icon at the time of capture, and the VR console infers an eye position corresponding to the reference image from a model of the eye and other eye tracking systems included in the VR headset. The VR console may store the reference images or may store a condensed representation of the reference image to facilitate matching with subsequent images from received eye tracking data. For example, the VR console generates a fingerprint for each reference image, extracts features (e.g., blobs, edges, ridges, corners) from each reference image, or both. An extracted feature may be stored in association with information identifying the feature's position on the surface of the user's eye, values of the feature's constituent pixels, or both. Using the reference images (or condensed representations thereof), the VR console may determine an eye position with reference to a single image from the received eye tracking data.

Using the accessed calibration data, the VR console determines an eye position from the received eye tracking data. In some embodiments, the VR console obtains a reference image associated with a reference eye position. For example, the image capture device captures the reference image at the same time another eye tracking system (e.g., a slow eye tracking system) independently determines the reference eye position. The VR console determines an updated eye position by determining a subpixel shift between an updated image and the reference image, determining an eye shift distance from the subpixel shift, and combining the reference eye position with the eye shift distance. To determine the subpixel shift, the VR console may use any motion tracking or optical flow technique (e.g., phase correlation, block matching, differential optical flow methods). The VR console determines the eye shift distance by multiplying the determined subpixel shift by the subpixel distance value from the accessed calibration data. The subpixel shift may be two-dimensional (e.g., 5 subpixels up, 3 subpixels left), so the eye shift distance may be two dimensional as well (e.g., 50 micrometers up, 30 micrometers left). Using the eye shift distance, the VR console determines the updated eye position by shifting the reference eye position by the eye shift distance. When determining the updated eye position, the VR console may: update the eye's orientation and location, determine updated axes of eye rotation, determine a new gaze location on the electronic display, or a combination thereof.

Alternatively or additionally, the VR console determines the eye position by matching an updated image with a reference image from accessed calibration data. The VR console compares the image from the image capture device to various reference images to determine a matching reference image. The VR console may determine the matching reference image by scoring reference images based on a degree of matching the updated image and selecting a reference image with the highest score. Alternatively or additionally, the reference images are compared to the updated image and scored until a reference image having a score exceeding a threshold value is identified. If the image capture device captures an image corresponding to 1 square millimeter of the eye, the calibration data includes about 500 images corresponding to different portions of the surface of the user's eye capable of being imaged over the eye's full range of motion. In some embodiments, the VR console generates a condensed representation of the updated image (e.g., a fingerprint, a set of features), and compares the condensed representation of the updated image to condensed representations of the reference images to reduce time and computation resources for determining the matching reference image. When the VR console determines the matching reference image, the VR console determines the updated position by adjusting the reference position associated with the matching reference image by a subpixel shift between the updated image and the reference image.

The VR console determines content for presentation by the VR headset based on the determined eye position. For example, the VR console uses an estimated gaze point included in the determined eye position as an input to a virtual world. Based on the gaze point, the VR console may select content for presentation to the user (e.g., selects a virtual anime creature corresponding to the gaze point for deployment against another virtual anime creature in a virtual gladiatorial contest, navigates a virtual menu, selects a type of sports ball to play in the virtual world, or selects a notorious sports ball player to join a fantasy sports ball team).

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
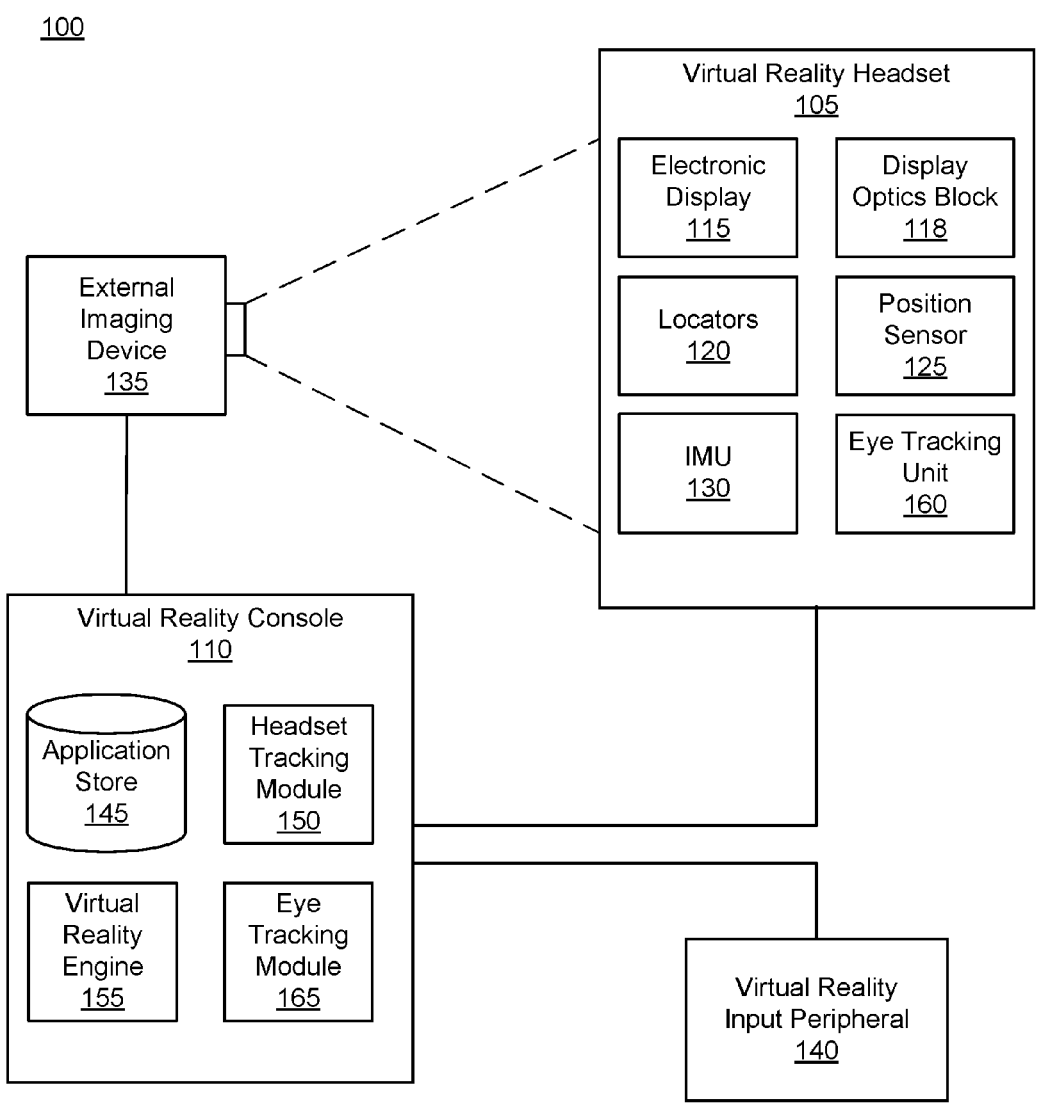
FIG. 1 is a block diagram of a system environment including a virtual reality system, in accordance with an embodiment.

FIG. 1 is a block diagram of a virtual reality (VR) system environment 100, in accordance with an embodiment. The VR system environment 100 shown by FIG. 1 comprises a VR headset 105, an external imaging device 135, and a VR input peripheral 140 that are each coupled to the VR console 110. While FIG. 1 shows an example VR system environment 100 including one VR headset 105, one external imaging device 135, and one VR input peripheral 140, any number of these components may be included in the VR system environment 100, or any of the components could be omitted. For example, there may be multiple VR headsets 105 monitored by one or more external imaging devices 135 in communication with the VR console 110. In alternative configurations, different or additional components may be included in the VR system environment 100.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIG. 2A and FIG. 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. However, in various embodiments, the VR headset 105 may be implemented in any suitable form factor, including glasses. Additionally, in various embodiments, the functionality described herein may be used in a headset that combines images of an environment external to the VR headset 105 and content received from the VR console 110, or from any other console generating and providing content for presentation to a user. Hence, the VR headset 105, and methods for eye tracking described herein, may augment images of an environment external to the VR headset 105 with generated content to present an augmented reality to a user.

In various embodiments, the VR headset 105 includes an electronic display 115, a display optics block 118, one or more locators 120, one or more position sensors 125, an inertial measurement unit (IMU) 130, and an eye tracking unit 160. The VR headset 105 may omit any of these elements or include additional elements in various embodiments. Additionally, in some embodiments, the VR headset 105 includes elements combining the function of various elements described in conjunction with FIG. 1.

VR Display Subsystem

The electronic display 115 displays images to the user according to data received from the VR console 110. In various embodiments, the electronic display 115 may comprise one or more display panels such as a liquid crystal display (LCD), an organic light emitting diode (OLED) display, an active-matrix OLED display (AMOLED), a transparent OLED display (TOLED), or some other display. For example, the electronic display 115 includes a front TOLED panel, a rear display panel, and an optical component (e.g., an attenuator, polarizer, diffractive, or spectral film) between the front and rear display panels. The electronic display 115 may include sub-pixels to emit light of a predominant color such as red, green, blue, white, or yellow. The electronic display 115 may display a three-dimensional (3D) image through stereo effects produced by two-dimensional (2D) panels to create a subjective perception of image depth. For example, the electronic display 115 includes a left display and a right display positioned in front of a user's left eye and right eye, respectively. The left and right displays present copies of an image shifted horizontally relative to each other to create a stereoscopic effect (i.e., a perception of image depth by a user viewing the image).

The display optics block 118 magnifies image light received from the electronic display 115, corrects optical errors associated with the image light, and presents the corrected image light to a user of the VR headset 105. In various embodiments the display optics block 118 includes one or more optical elements. Example optical elements include: an aperture, a Fresnel lens, a convex lens, a concave lens, a filter, or any other suitable optical element that affects image light emitted from the electronic display 115. The display optics block 118 may include combinations of different optical elements as well as mechanical couplings to maintain relative spacing and orientation of the optical elements in a combination. One or more optical elements in the display optics block 118 have an optical coating, such as an anti-reflective coating, or a combination of optical coatings.

Magnification of the image light by the display optics block 118 allows the electronic display 115 to be physically smaller, weigh less, and consume less power than larger displays. Additionally, magnification may increase a field of view of the displayed content. For example, the field of view of the displayed content is such that the displayed media is presented using almost all (e.g., 110 degrees diagonal) or all of the user's field of view. In some embodiments, the display optics block 118 has an effective focal length larger than the spacing between the display optics block 118 and the electronic display 115 to magnify image light projected by the electronic display 115. Additionally, the amount of magnification of image light by the display optics block 118 may be adjusted by adding or by removing optical elements from the display optics block 118.

The display optics block 118 may be designed to correct one or more types of optical error, such as two-dimensional optical errors, three-dimensional optical errors, or a combination thereof. Two-dimensional errors are optical aberrations that occur in two dimensions. Example types of two-dimensional errors include: barrel distortion, pincushion distortion, longitudinal chromatic aberration, and transverse chromatic aberration. Three-dimensional errors are optical errors that occur in three dimensions. Example types of three-dimensional errors include: spherical aberration, comatic aberration, field curvature, and astigmatism. In some embodiments, content provided to the electronic display 115 for display is pre-distorted, and the display optics block 118 corrects the distortion when it receives image light from the electronic display 115 generated based on the content.

External VR Headset Tracking Subsystem

The locators 120 are objects located in specific positions on the VR headset 105 relative to one another and relative to a specific reference point on the VR headset 105. The virtual reality console 110 identifies the locators 120 in images captured by the external imaging device 135 to determine the virtual reality headset's position, orientation, or both. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (about 380 nm to 750 nm), in the infrared (IR) band (about 750 nm to 1 mm), in the ultraviolet band (10 nm to 380 nm), in another portion of the electromagnetic spectrum, or in any combination of portions of the electromagnetic spectrum.

In some embodiments, the locators 120 are located beneath an outer surface of the VR headset 105. A portion of the VR headset 105 between a locator 120 and an entity external to the VR headset 105 (e.g., the external imaging device 135, a user viewing the outer surface of the VR headset 105) is transparent to the wavelengths of light emitted or reflected by the locators 120 or is thin enough not to substantially attenuate the wavelengths of light emitted or reflected by the locators 120. In some embodiments, the outer surface or other portions of the VR headset 105 are opaque in the visible band of wavelengths of light. Thus, the locators 120 may emit light in the IR band under an outer surface that is transparent in the IR band but opaque in the visible band.

The external imaging device 135 generates slow calibration data in accordance with calibration parameters received from the VR console 110. Slow calibration data includes one or more images showing observed positions of the locators 120 that are detectable by the external imaging device 135. The external imaging device 135 may include one or more cameras, one or more video cameras, any other device capable of capturing images including one or more of the locators 120, or some combination thereof. Additionally, the external imaging device 135 may include one or more filters (e.g., to increase signal to noise ratio). The external imaging device 135 is configured to detect light emitted or reflected from locators 120 in a field of view of the external imaging device 135. In embodiments where the locators 120 include passive elements (e.g., a retroreflectors), the external imaging device 135 may include a light source that illuminates some or all of the locators 120, which retro-reflect the light towards the light source in the external imaging device 135. Slow calibration data is communicated from the external imaging device 135 to the VR console 110, and the external imaging device 135 receives one or more calibration parameters from the VR console 110 to adjust one or more imaging parameters (e.g., focal length, focus, frame rate, sensor temperature, shutter speed, aperture).

Internal VR Headset Tracking Subsystem

The IMU 130 is an electronic device that generates fast calibration data based on measurement signals received from one or more of the position sensors 125. A position sensor 125 generates one or more measurement signals in response to motion of the VR headset 105. Examples of position sensors 125 include: accelerometers gyroscopes, magnetometers, other motion-detecting or error-correcting sensors, or some combination thereof. In some embodiments, various position sensors 125 are oriented orthogonally to each other. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates measurement signals received form accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. While the reference point may generally be defined as a point in space, the reference point may be defined as a point within the VR headset 105 (e.g., a center of the IMU 130) in various embodiments.

Eye Tracking Subsystem

The eye tracking unit 160 includes one or more imaging devices configured to capture eye tracking data, which the eye tracking module 165 uses to track the VR headset user's eye. Eye tracking data refers to data output by the eye tracking unit 160. Example eye tracking data includes include images captured by the eye tracking unit 160 or information derived from images captured by the eye tracking unit 160. Eye tracking refers to determining an eye's position, including orientation and location of the eye relative to the VR headset 105. For example, the eye tracking module 165 outputs the eye's pitch and yaw based on images of the eye captured by the eye tracking unit 160. In various embodiments, the eye tracking unit 160 measures electromagnetic energy reflected by the eye and communicates the measured electromagnetic energy to the eye tracking module 165, which determines the eye's position based on the measured electromagnetic energy. For example, the eye tracking unit 160 measures electromagnetic waves such as visible light, infrared light, radio waves, microwaves, waves in any other part of the electromagnetic spectrum, or a combination of these reflected by an eye of a user.

The eye tracking unit 160 may include one or more eye tracking systems. An eye tracking system includes an imaging system to image one or more eyes and may optionally include a light emitter, which generates light that is directed towards an eye so light reflected by the eye may be captured by the imaging system. For example, the eye tracking unit 160 includes a coherent light source emitting light in the visible spectrum or infrared spectrum as well as a camera capturing reflections of the emitted light by the user's eye. As another example, the eye tracking unit 160 captures reflections of radio waves emitted by a miniature radar unit. The eye tracking unit 160 uses low-power light emitters that emit light at frequencies and intensities that do not injure the eye or cause physical discomfort. The eye tracking unit 160 is arranged to increase contrast in images of an eye captured by the eye tracking unit 160 while reducing overall power consumed by the eye tracking unit 160 (e.g., reducing power consumed by a light emitter and an imaging system included in the eye tracking unit 160). For example, the eye tracking unit 160 consumes less than 100 milliwatts of power.

In some embodiments, the eye tracking unit 160 includes one light emitter and one camera to track each of the user's eyes. The eye tracking unit 160 may also include different eye tracking systems that operate together to provide improved eye tracking accuracy and responsiveness. For example, the eye tracking unit 160 includes a fast eye tracking system with a fast response time and a slow eye tracking system with a slower response time. The fast eye tracking system frequently measures an eye to capture data used by the eye tracking module 165 to determine the eye's position relative to a reference eye position. The slow eye tracking system independently measures the eye to capture data used by the eye tracking module 165 to determine the reference eye position without reference to a previously determined eye position. Data captured by the slow eye tracking system allows the eye tracking module 165 to determine the reference eye position with greater accuracy than the eye's position determined from data captured by the fast eye tracking system. In various embodiments, the slow eye tracking system provides eye tracking data to the eye tracking module 165 at a lower frequency than the fast eye tracking system. For example, the slow eye tracking system has a slower response time or operates less frequently to conserve power.

VR Input Peripheral

The VR input peripheral 140 is a device that allows a user to send action requests to the VR console 110. An action request is a request to perform a particular action. For example, an action request may be to start or to end an application or to perform a particular action within the application. The VR input peripheral 140 may include one or more input devices. Example input devices include: a keyboard, a mouse, a game controller, a glove, or any other suitable device for receiving action requests and communicating the received action requests to the VR console 110. An action request received by the VR input peripheral 140 is communicated to the VR console 110, which performs an action corresponding to the action request. In some embodiments, the VR input peripheral 140 may provide haptic feedback to the user in accordance with instructions received from the VR console 110. For example, the VR input peripheral 140 provides haptic feedback when an action request is received or when the VR console 110 communicates instructions to the VR input peripheral 140 causing the VR input peripheral 140 to generate haptic feedback when the VR console 110 performs an action.

VR Console

The VR console 110 provides media to the VR headset 105 for presentation to the user in accordance with information received from one or more of the external imaging device 135, the VR headset 105, and the VR input peripheral 140. In the example shown in FIG. 1, the VR console 110 includes an application store 145, a headset tracking module 150, a virtual reality (VR) engine 155, and an eye tracking module 165. Some embodiments of the VR console 110 have different or additional modules than those described in conjunction with FIG. 1. Similarly, the functions further described below may be distributed among components of the VR console 110 in a different manner than is described here.

In some embodiments, the VR console 110 includes a processor and a non-transitory computer-readable storage medium storing instructions executable by the processor. The processor may include multiple processing units executing instructions in parallel. The computer-readable storage medium may be any memory such as a hard disk drive, a removable memory, or a solid-state drive (e.g., flash memory, dynamic random access memory (DRAM)). In various embodiments, the modules of the VR console 110 described in conjunction with FIG. 1 are encoded as instructions in the non-transitory computer-readable storage medium that, when executed by the processor, cause the processor to perform the functionality further described below.

The application store 145 stores one or more applications for execution by the VR console 110. An application is a group of instructions, that when executed by a processor, generates content for presentation to the user. Content generated by an application may be in response to inputs received from the user via movement of the VR headset 105 or of the VR input peripheral 140. Examples of applications include: gaming applications, conferencing applications, video playback application, or other suitable applications.

The headset tracking module 150 calibrates the VR system environment 100 using one or more calibration parameters and may adjust one or more calibration parameters to reduce error in determining the position of the VR headset 105. For example, the headset tracking module 150 adjusts the focus of the external imaging device 135 to obtain a more accurate position for observed locators on the VR headset 105. Moreover, calibration performed by the headset tracking module 150 also accounts for information received from the IMU 130. Additionally, if tracking of the VR headset 105 is lost (e.g., the external imaging device 135 loses line of sight of at least a threshold number of the locators 120), the headset tracking module 150 re-calibrates some or all of the calibration parameters.

The headset tracking module 150 tracks movements of the VR headset 105 using slow calibration information from the external imaging device 135. For example, the headset tracking module 150 determines positions of a reference point of the VR headset 105 using observed locators from the slow calibration information and a model of the VR headset 105. The headset tracking module 150 also determines positions of a reference point of the VR headset 105 using position information from the fast calibration information. Additionally, in some embodiments, the headset tracking module 150 may use portions of the fast calibration information, the slow calibration information, or some combination thereof, to predict a future location of the VR headset 105. The headset tracking module 150 provides the estimated or predicted future position of the VR headset 105 to the VR engine 155.

The VR engine 155 executes applications within the VR system environment 100 and receives position information of the VR headset 105, acceleration information of the VR headset 105, velocity information of the VR headset 105, predicted future positions of the VR headset 105, or some combination thereof from the headset tracking module 150. The VR engine 155 also receives estimated eye position and orientation information from the eye tracking module 165. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input peripheral 140 and provides feedback to the user indicating that the action was performed. The feedback may be visual or audible feedback via the VR headset 105 or haptic feedback via the VR input peripheral 140.

The eye tracking module 165 receives eye tracking data from the eye tracking unit 160 and determines an eye position of a user's eye based on the eye tracking data for the eye. The eye position specifies an eye's orientation, location, or both relative to the VR headset 105 or any element thereof. Because the eye's axes of rotation change as a function of the eye's location in its socket, determining the eye's location in its socket allows the eye tracking module 165 to more accurately determine eye orientation. Eye position may also identify an area of the electronic display 115 on which an eye is focused determined from the eye's position, location, or both.

In some embodiments, the eye tracking unit 160 outputs eye tracking data including images of the eye, and the eye tracking module 165 determines the eye's position from the images. For example, the eye tracking module 165 stores a mapping between images captured by the eye tracking unit 160 and eye positions to determine a reference eye position from an captured image captured by the eye tracking unit 160. Alternatively or additionally, the eye tracking module 165 determines an updated eye position relative to a reference eye position by comparing an image captured by the eye tracking unit 160 at a time the reference eye position was determined to an image captured at a time the updated eye position was determined. The eye tracking module 165 may determine eye position using measurements from different imaging devices or other sensors. For example, the eye tracking module 165 uses measurements from a slow eye tracking system to determine a reference eye position and then determines updated positions relative to the reference eye position from a fast eye tracking system until determining a next reference eye position based on measurements from the slow eye tracking system.

The eye tracking module 165 may determine eye calibration parameters to improve precision and accuracy of eye tracking. Eye calibration parameters include parameters that may change whenever a user dons or adjusts the VR headset 105. Example eye calibration parameters include an estimated distance between a component of the eye tracking unit 160 and one or more parts of the eye such as the eye's center, pupil, cornea boundary, or a point on the surface of the eye. Other example eye calibration parameters may be specific to a particular user and include an estimated average eye radius, an average corneal radius, an average sclera radius, a map of features on the eye surface, and an estimated eye surface contour. In embodiments where light from outside the VR headset 105 reaches the eye (as in some augmented reality applications), the calibration parameters may include correction factors for intensity and color balance due to variations in light from outside the VR headset 105. The eye tracking module 165 may use eye calibration parameters to determine when measurements captured by the eye tracking unit 160 allow the eye tracking module 165 to determine an accurate eye position (also referred to herein as "valid measurements"). Invalid measurements, from which the eye tracking module 165 is unable to determine an accurate eye position, may be caused by the user blinking, adjusting the headset, or removing the headset as well as by the VR headset 105 experiencing greater than a threshold change in illumination due to external light.

VR Headset

Figure 2A:
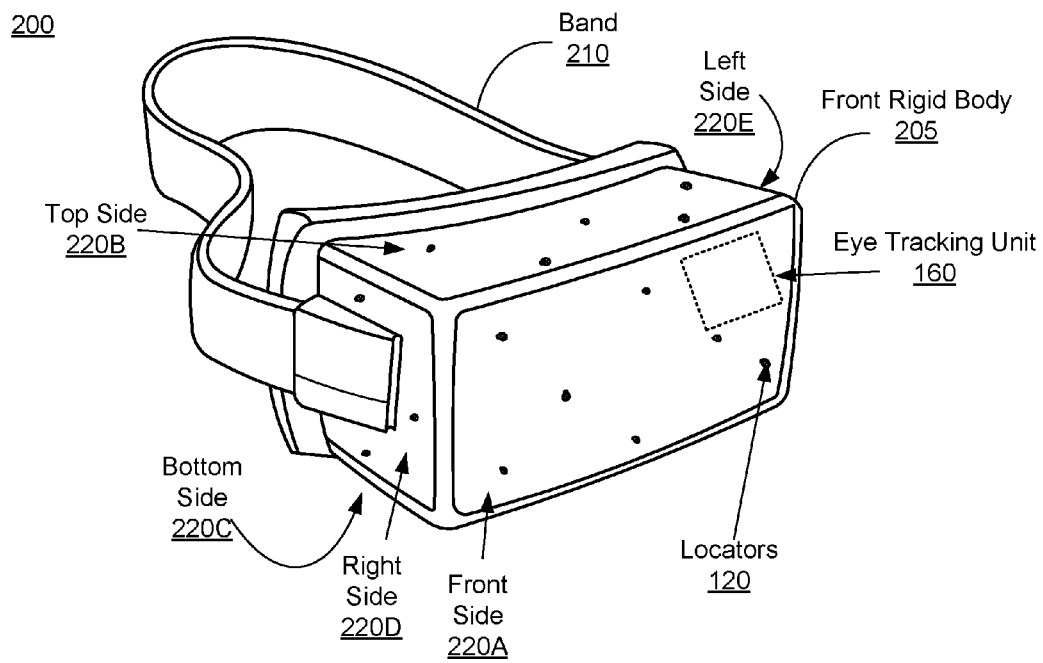
FIG. 2A is a diagram of a virtual reality headset, in accordance with an embodiment.

FIG. 2A is a diagram of one embodiment of the virtual reality (VR) headset 105. The VR headset 200 includes a front rigid body 205 and a band 210. The front rigid body 205 includes the electronic display 115 (not shown in FIG. 2A), the IMU 130 (not shown in FIG. 2A), the one or more position sensors 125 (not shown in FIG. 2A), the locators 120, and the eye tracking unit 160. In other embodiments, the VR headset 200 may include different or additional components than those depicted by FIG. 2A.

The locators 120 are located in fixed positions on the front rigid body 205 relative to one another and relative to a reference point. For example, the reference point is located at the center of the IMU 130. Each of the locators 120 emit light that is detectable by the external imaging device 135. Locators 120, or portions of locators 120, are located on a front side 220A, a top side 220B, a bottom side 220C, a right side 220D, and a left side 220E of the front rigid body 205 in the example of FIG. 2A.

In the example of FIG. 2A, the eye tracking unit 160 is not visible from outside of the VR headset 200. The eye tracking unit 160 may or may not be visible for a user looking into the VR headset 200 from behind. However, the eye tracking unit 160 is typically located in the top side 220B, the bottom side 220C, the right side 220D, or the left side 220E to avoid obstructing the user's view of the electronic display 115. For example, the eye tracking unit 160 is located in a corner of the VR headset 220 along an of the edge between two of the top side 220B, the right side 220D, the bottom side 220C, or the left side 220E.

Figure 2B:
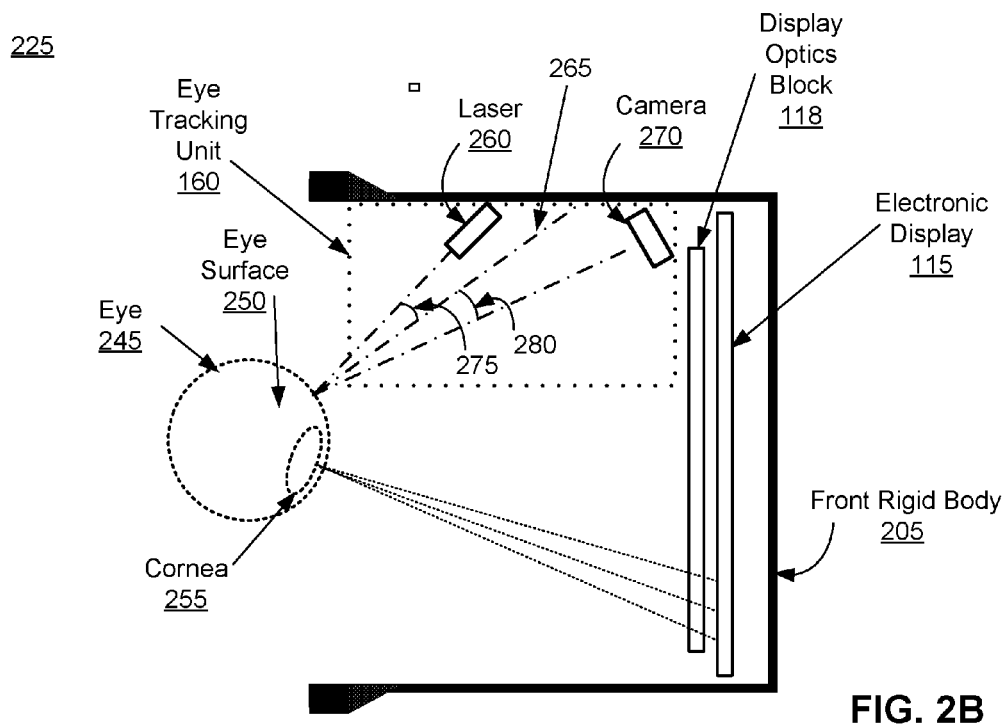
FIG. 2B is a cross-section view of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes a display optics block 118 that alters image light from the electronic display 115 and provides the altered image light to a pupil of an eye 245 located within a cornea 255 of the eye 245. The eye tracking unit 160 is positioned closer to the eye 245 than the display optics block 118. In various embodiments, the eye tracking unit 160 is positioned above, below, left, or right of the user's line of sight to the display optics block 118 and to electronic display 115. For example, one or more components of the eye tracking unit 160 are positioned adjacent to a corner of the display optics block 118. To illustrate the details of the eye tracking unit 160, FIG. 2B may exaggerate some distances or angles between the VR headset's components. For example, the distance between the optics block 118 and the electronic display 115 exceeds the distance between the eye 245 and the display optics block 118 in some embodiments. For purposes of illustration, FIG. 2B shows a cross section 225 associated with a single eye 245, but another display optics block 118, another electronic display 115, or both may provide altered image light to another eye of the user. Similarly, another eye tracking unit 160 may track another eye of the user.

The eye tracking unit 160 includes a coherent light source, such as laser 260, as well as an imaging system, such as camera 270. The laser 260 illuminates a portion of the eye's surface 250, and the camera 270 measures light reflected by the eye surface 250. The eye surface 250 may refer to the surface of the eye's sclera, iris, or both. The laser 260 is mounted at a laser angle 275 relative to a surface normal vector 265 of the eye 245, and the camera 270 is mounted at a camera angle 280 relative to the surface normal vector 265 of the eye 245. The surface normal vector 265 is orthogonal to a portion of the eye surface 250 illuminated by the laser 260. For example, the laser angle 275 is measured between the surface normal vector 265 and a line from a center of the portion of the eye surface 250 illuminated by the laser 260 to a center of the laser's output aperture. The camera angle 280 may be measured between the surface normal vector 265 and a line from the center of the illuminated portion of the eye surface 250 to a center of the camera's light sensor or light input aperture. In some embodiments, a difference between the laser angle 275 and the camera angle 280 is less than a threshold amount so the camera 270 captures images of specular reflections of light incident on the eye surface 250, which beneficially increases contrast of the resulting image and minimizes light power loss and power consumption.

In various embodiments, the laser 260 illuminates a portion of the eye surface 250 with coherent light. For example, the laser 260 emits light in the infrared spectrum having a wavelength between 832 nm and 852 nm. As another example, the laser 260 emits light having a wavelength between 900 nm and 1550 nm. Alternatively, the laser 260 emits lights having a wavelength in the visible spectrum. However, illuminating the eye surface 250 in the infrared spectrum beneficially reduces interference and noise from visible light emitted by the electronic display 115 or from external visible light that passes into the VR headset 200, as in some augmented reality applications. The laser 260 may be positioned to minimize light incident on the pupil of the eye 245. Additionally, the laser 260 typically has low power to prevent user discomfort or injury. For example, the laser is a Class 1 laser with a power of about 0.3 microwatts. As another example, the laser 260 is an edge emitting semiconductor laser or a vertical-cavity surface-emitting laser (VCSEL).

Although the eye tracking unit 160 typically includes a coherent light source (i.e., a light source emitting light at a precise wavelength with negligible phase difference), non-coherent light sources may be used. In some embodiments, the eye tracking unit 160 includes a light emitting diode (LED) emitting light having wavelengths in the visible band or in the infrared band. However, because LEDs emit across a broad wavelength band relative to a laser 260, LEDs may produce images with lower contrast than those produced using a coherent light source. In some embodiments, an additional laser 260 (or other light source) supplements the laser 260 (or LED or other light source) and emits light at a different wavelength than the laser 260 (or other light source) to increase eye tracking precision.

The camera 270 captures light reflected by the portion of the eye surface 250 illuminated by the laser 260 or other coherent light source. For example, the camera 270 captures an image with a pixel array of 30 by 30 pixels, where a pixel corresponds to a resolution of 15 to 40 micrometers of the eye surface 250. In this example, the imaged portion of the eye surface 250 has an area between 0.20 and 1.44 square millimeters. The imaged portion of the eye surface 250 has a size within a threshold amount of a size of the portion of the eye surface 250 illuminated by the laser 260.

In various embodiments, the camera 270 has increased resolution to increase eye tracking precision and accuracy. For example, the camera 270 has a quarter video graphic array (QVGA) resolution with a pixel array of 320 pixels by 240 pixels. Increasing the number of pixels included in the camera 270 allows the size of the eye surface 250 corresponding to a pixel to be decreased, allows area of the eye surface 250 imaged by the camera 270 to be increased, or some combination of these. However, using fewer pixels beneficially reduces power consumed by the camera 270, and using a smaller area for imaging and illumination beneficially reduces power consumption by the laser 260. In some embodiments, the camera 270 is an optical mouse sensor or other sensor capturing a very high frame rate. For example, the camera 270 captures about 5,000 images per second to provide precise eye tracking data.

Eye Tracking Unit

Figure 3A:
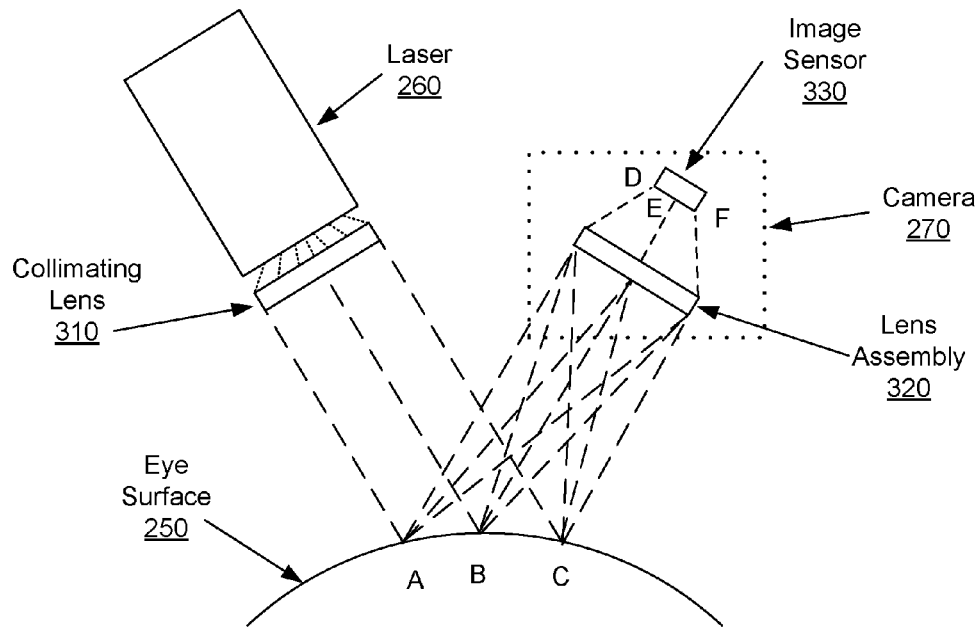
FIG. 3A is a diagram of an example eye tracking unit, in accordance with an embodiment.

FIG. 3A is a diagram of one embodiment of an eye tracking unit 160. The eye tracking unit 160 includes a laser 260, which includes a collimating lens 310, and a camera 270, which includes a lens assembly 320 and an image sensor 330. In other embodiments, the eye tracking unit 160 may include different and/or additional components than those described in conjunction with FIG. 3A.

The collimating lens 310 aligns light emitted by the laser 260 into parallel beams directed toward the eye surface 250. In some embodiments, the collimating lens 310 is integral to the laser 260. Collimating light emitted by the laser 260 causes the light emitted by the laser to uniformly illuminate a portion of the eye surface 250 imaged by the camera 270. Non-uniform illumination of the illuminated portion of the eye surface 250 would cause different portions of the image captured by the camera 270 to have different luminance ranges, reducing contract of the image of the eye surface 250 captured by the camera 270. Thus, the collimating lens 310 improves contrast in the resulting image captured by the camera 270. Additionally, collimating light emitted by the laser 260 using the collimating lens 310 or other component, reduces light from the laser 260 incident on the eye surface 250 outside the imaged portion of the eye surface 250. This reduces power consumed by the laser 260 by reducing light emitted by the laser that is not subsequently reflected toward the camera 270.

In the example of FIG. 3A, light emitted from the laser 260 illuminates the eye surface 250 between points A and B and between points B and C. While the cross-sectional view of FIG. 3A shows the light emitted from the laser 260 illuminating an arc, collimated light emitted by the laser 260 typically illuminates a circular or elliptical area of the eye surface 250. Because the eye surface 250 is rough (e.g., due to features such as capillaries or bumps), the eye surface 250 scatters the incident light in multiple directions. Different portions of the eye surface 250 have different arrangements of features, so a diffraction pattern from light reflected off a portion of the eye surface 250 accounts for the arrangement of features within the portion, which allows identification of that portion of the eye surface 250 from its diffraction pattern. The light incident on the eye surface 250 may refract a small distance into the eye before being reflected and scattered (e.g., when the emitted light is in the infrared spectrum), so references to the "eye surface" herein also include portions of the eye through which emitted light and reflected light is transmitted.

The lens assembly 320 collects and images light reflected by the eye surface 250 onto the image sensor 330. Additionally, the lens assembly 320 corrects one or more optical errors (such as those described with respect to the display optics block 118) to improve the contrast and other properties of the images captured by the image sensor 330. The lens assembly 320 may magnify the reflected light, in some embodiments. Alternatively, the lens assembly 320 applies only negligible magnification to the reflected light.

The image sensor 330 captures incident light focused by the lens assembly 320. Because of the scattering at the eye surface 250, light incident at point D on the image sensor 330 in FIG. 3A results from interference from light reflected from multiple points within the illuminated portion of the eye surface 250 such as points A, B, and C. Similarly, light incident at both points E and F of the image sensor 330 in FIG. 3A results from interference between light reflected from multiple points on the eye surface 250. Hence, the image sensor 330 captures the diffraction or speckle pattern of the eye surface 250. For each pixel, the image sensor 330 includes a light-sensitive circuit that outputs a current or voltage proportional to intensity of incident light on the pixel.

In one embodiment, the image sensor 330 is sensitive to a narrow band of light wavelengths including the wavelength emitted by the laser 260, so the output of the light sensitive circuit corresponding to a pixel, or to a subpixel, is proportional to an intensity of light having wavelengths within the narrow band of wavelengths on the pixel or on the subpixel. In other embodiments, the image sensor 330 has wide-band or multi-band sensitivity, so the output of a light sensitive circuit corresponding to a pixel or to a subpixel is proportional to an intensity of light having wavelengths within the wide-band range of the image sensor 330 on the pixel or on the subpixel. For example, the image sensor 330 includes a complementary metal-oxide semiconductor (CMOS) array, which may be used with laser light having a wavelength less than about 850 nm. As another example, the image sensor 330 includes an array based on an indium gallium arsenide (InGaAs) alloy. Such an image sensor 330 may be used with a laser 260 emitting laser light having a wavelength between about 900 nm and about 1550 nm.

Figure 3B:
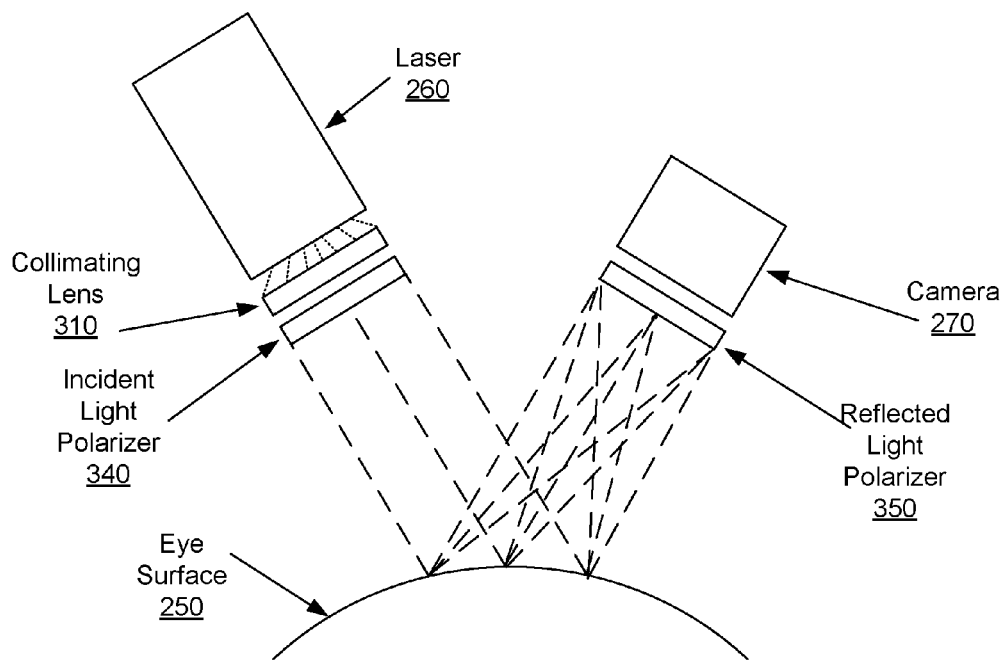
FIG. 3B is a diagram of an example eye tracking unit including polarization-sensitive elements, in accordance with an embodiment.

FIG. 3B is a diagram of one embodiment of an eye tracking unit 160 that includes polarization-sensitive elements. The eye tracking unit 160 shown in FIG. 3B includes a laser 260, a collimating lens 310, an incident light polarizer 340, a reflected light polarizer 350, and a camera 270. However, in other embodiments, the eye tracking unit 160 may include different and/or additional components than those described in conjunction with FIG. 3B. Alternatively, the eye tracking unit 160 may include components that combine the functionality provided by multiple components in the embodiment described in conjunction with FIG. 3B.

The incident light polarizer 340 polarizes light emitted from the laser 260. For example, the incident light polarizer 340 is a quarter-wave plate that circularly polarizes light emitted by the laser 260. As another example, the incident light polarizer 340 is a variable light polarizer such as a liquid crystal element. By applying an electrical field to modify the orientation of the liquid crystals, the eye tracking unit 160 may dynamically alter the polarization state of light incident on the eye surface 250. In some embodiments, the polarizer 340 is omitted. For example, the laser 260 emits light linearly polarized in the incident plane of light reflected by the eye surface 250. The eye surface 250 modifies the polarization state (e.g., polarization orientation, degree of polarization) of light emitted by the laser 260 that illuminates the eye surface 250. Because the eye is generally ellipsoidal and has a rough surface, light emitted by the laser 260 that illuminates different portions of the eye surface 250 is reflected at different angles with different polarization states.

The reflected light polarizer 350 filters light reflected from the eye surface 250 toward the camera 270 to a particular polarization plane, so the camera 270 measures a degree to which the reflected light conforms to the polarization plane of the reflected light polarizer 350. For example, the reflected light polarizer 350 is a half-wave plate that linearly polarizes light imaged by the camera 270. The camera 270 measures a degree to which a polarization state of light reflected by the eye surface 250 matches a polarization plane of the reflected light polarizer 350. For example, the reflected light polarizer 350 polarizes light to the incident plane of the light reflected by the eye surface 250. Alternatively or additionally, the reflected light polarizer 350 is a liquid crystal element, which may dynamically alter the polarization state of light reflected by the eye surface 250 according to an applied electrical field the modifies the orientation of the liquid crystals. In other embodiments, the reflected light polarizer 350 also includes a quarter-wave plate to circularly polarize the linearly polarized light and improve functionality of the camera 270. Using polarized light reduces interference from light sources other than the laser 260.

The intensity of light incident at the camera 270 indicates the degree to which light incident on the reflected light polarizer 350 matches the polarization plane of the reflected light polarizer 350. Accordingly, the camera 270 captures an image where a pixel's intensity indicates a polarization state from a particular portion of the eye surface 250, and thus provides information about the local direction of electron oscillation and the orientation of the surface normal vector at the particular portion of the eye surface 250. Depending on the polarization state of the light incident on the eye surface 250, the intensity of the polarization-filtered light captured by the camera 270 may have a local minimum, a local maximum, or any intensity value in-between, at each particular pixel. The eye tracking module 165 may determine surface normal vectors of different portions of the eye surface 250 from the intensity of image pixels by computing the angle of linear polarization. Using these surface normal vectors, the eye tracking module 165 derives a model of the eye surface's contours. Alternatively or additionally, the eye tracking module 165 may determine the degree of linear polarization of each pixel. Using the degree of linear polarization as pixel values of an image, which the eye tracking module 165 uses to determine eye position as described with respect to FIGS. 4A through 5.

Figure 3C:
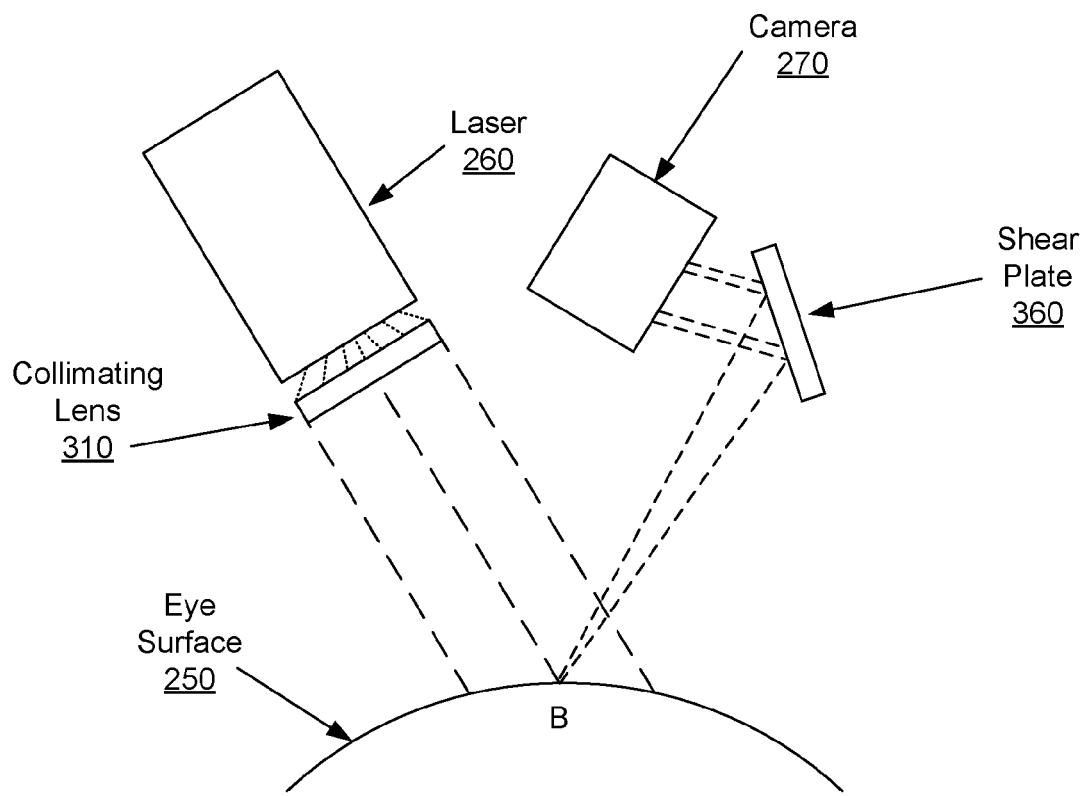
FIG. 3C is a diagram of an example eye tracking unit including one or more elements to produce a shear interference effect, in accordance with an embodiment.

FIG. 3C is a diagram of one embodiment of an eye tracking unit 160 including one or more elements to produce a shear interference effect. In the example of FIG. 3C, the eye tracking unit 160 includes a laser 260 with a collimating lens 310, a shear plate 360, and a camera 270. However, in other embodiments, the eye tracking unit 160 may include different and/or additional components than those described in conjunction with FIG. 3C. Alternatively, the eye tracking unit 160 may include components that combine the functionality provided by multiple components in the embodiment described in conjunction with FIG. 3C.

The shear plate 360 produces a shear interference effect between shifted reflections off the shear plate 360, which increases contrast of the image captured by the camera 270. A front surface of the shear plate 360 reflects a portion of incident light reflected from the eye surface 250. Another portion of incident light on the shear plate 360 is refracted by the front surface of the shear plate 360, reflected against a back surface of the shear plate 360, and refracted again by the front surface of the shear plate 360. Thus, the shear plate 360 produces two or more interfering reflections that are captured by the camera 270. The interference pattern between these multiple reflections depends on the difference between slopes of the front and rear surfaces of the shear plate 360. For example, the shear plate 360 is a microscope coverslip oriented at 45° to the light reflected by the eye surface 250, which maximizes sensitivity of the camera 270. In other embodiments, the shear plate 360 is a grating that causes interference or an air-wedge shearing interferometer.

Using a grating in place of the shear plate 360 may decrease the length of the optical path and facilitate miniaturization.

Light reflected from the eye surface 250 contains amplitude and phase information corresponding to height fluctuations on the eye surface 250. The shear plate 360 (or grating) causes interference between light reflected by the eye surface 250 and a spatially separated copy of the light reflected by the eye surface 250. The resulting image depends on the orientation of the eye surface 250 (as well as the relative orientation of the shear plate's front and back surfaces). The shear plate 360 (or grating) beneficially increases contrast of the resulting image.

Although illustrated as separate embodiments for purposes of illustration, any combination of the elements illustrated in FIGS. 3A, 3B, and 3C may be present in various embodiments of the eye tracking unit 160. For example, the eye tracking unit 160 includes an incident light polarizer 340, a reflected light polarizer 350, a shear plate 360, or any combination thereof, to produce a shear interference effect in combination with a polarization-sensing effect. Using collimated light incident on the eye surface 250, polarization-filtered light incident on the camera 270, and sheared light incident on the camera 270, or a combination thereof, increases the contrast of light scattered by the eye surface 250, enabling use of a lower power laser without decreasing the accuracy of the eye tracking unit 160.

Eye Tracking

Figure 4A:
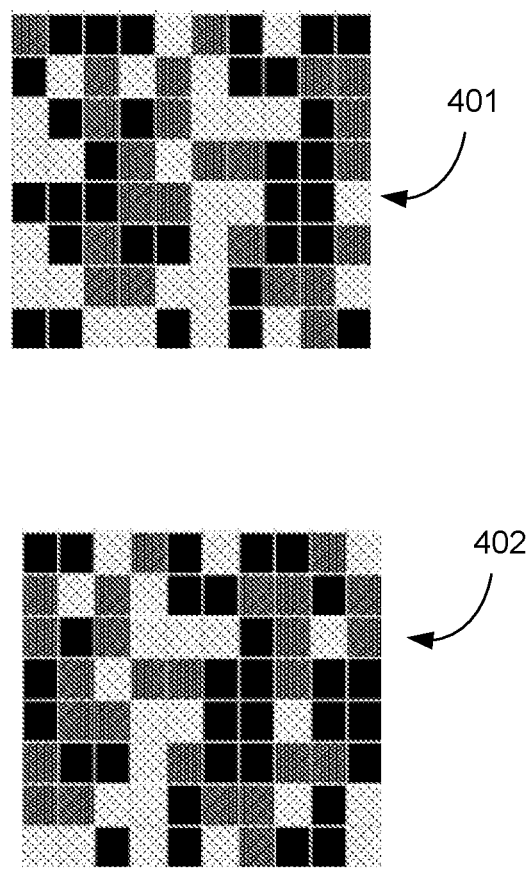
FIG. 4A shows example images captured by the eye tracking unit, in accordance with an embodiment.

FIG. 4A shows example images 401 and 402 captured by the eye tracking unit 160. The camera 270 captures image 401 of the eye surface 250 at an initial time and captures image 402 of the eye surface 250 at a later time. For purposes of illustration, images 401 and 402 represent images captured by an image sensor 330 with a 10 by 10 pixel array, but other embodiments may have different numbers of pixels. In FIG. 4A, different colors of the pixels correspond to different intensities of light from the interference between light scattered off multiple points of the eye surface 250. Accordingly, images 401 and 402 may be interpreted as diffraction patterns of the illuminated portion of the eye surface 250.

To determine a position change of an eye, the eye tracking module 165 determines a subpixel shift between image 401 and image 402. Multiplying the subpixel shift by a calibrated distance per pixel allows the eye tracking module 165 to determine a distance the eye surface 250 has shifted between the initial time and the later time. For example, the pattern captured in image 402 is shifted two subpixels left relative to the pattern captured in image 401. If a subpixel corresponds to a distance of 10 micrometers at the eye surface 250, for example, then the eye surface 250 has moved 20 micrometers left at the later time of image 402 relative to its position at the initial time of image 401.

Alternatively or additionally, the eye tracking module 165 determines the position of the eye in one of the images 401 or 402 by comparison to previous images having known positions of the eye. For example, the eye tracking module 165 includes a database of images that are each associated with a reference eye position. By matching image 402 with a stored image, the eye tracking module 165 determines that the eye has the reference eye position associated with the stored image. In some embodiments, the eye tracking module 165 identifies a surface feature in a portion of captured image 402. The surface feature is a diffraction or optical flow pattern associated with a particular portion of the eye surface 250. The eye tracking module 165 may determine the eye position by: retrieving a reference eye position associated with the surface feature when the surface feature was captured in a reference image; determining a subpixel shift between the surface feature in the captured image and the surface feature in the reference image; and determining the eye position by modifying the reference eye position according to the determined subpixel shift using the calibrated distance per pixel.

Figure 4B:
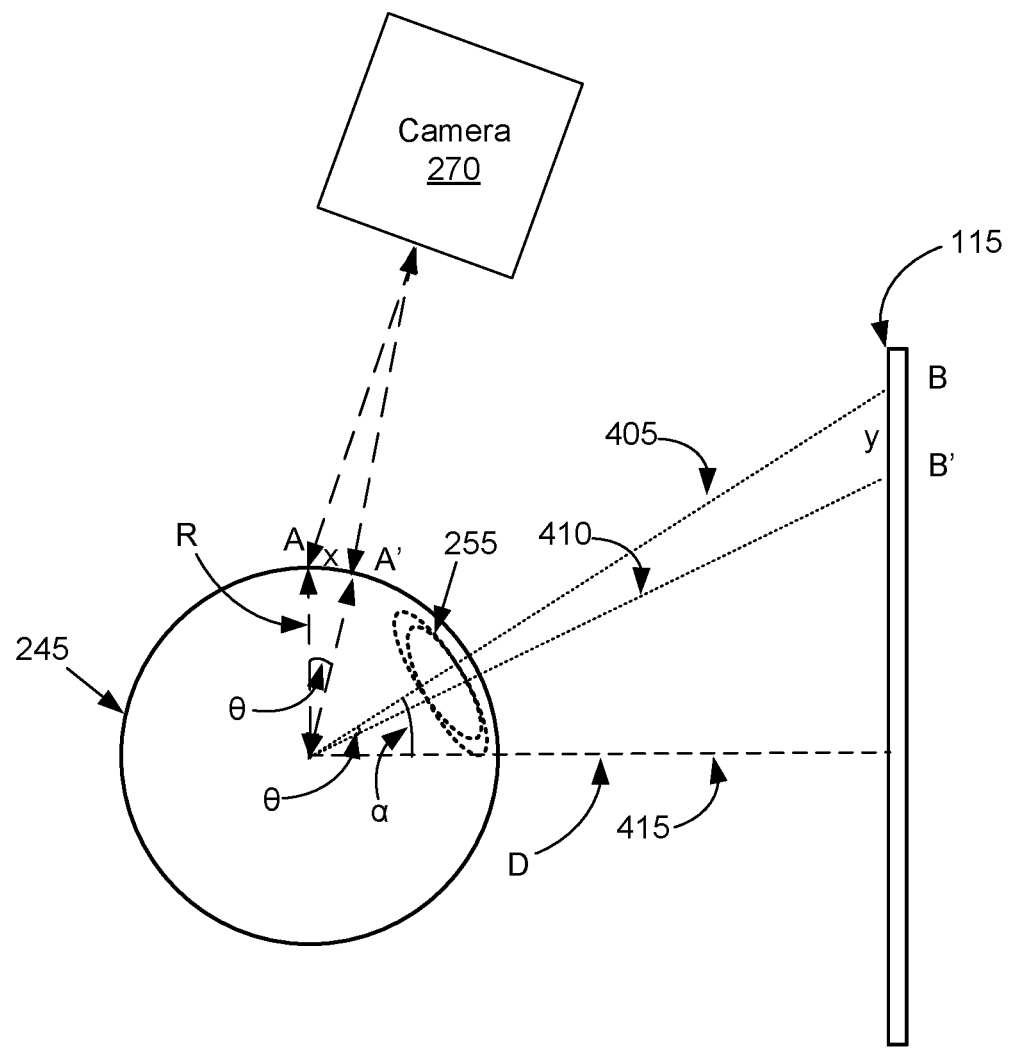
FIG. 4B is a conceptual diagram illustrating a relationship between eye movement derived from the images in FIG. 4A and eye tracking relative to the display, in accordance with an embodiment.

FIG. 4B is a conceptual diagram illustrating an example relationship between eye movement derived from the images in FIG. 4A and eye tracking relative to the display 115. FIG. 4B illustrates a simplified cross-section of the VR headset 105 including the camera 270, the eye 245, and the electronic display 115. Other embodiments may include additional elements that modify an optical path between the eye's pupil the electronic display 115 and accordingly modify the relationships given in the illustrated example.

In FIG. 4B, reference point A is a reference position of a surface feature, and point A' is a position of the surface feature corresponding to an updated eye position. The eye tracking module 165 determines an eye shift distance x between points A and A' that corresponds to a difference between the reference position of the surface feature and an updated position of the surface feature. In some embodiments, the reference position is an eye position at a time of a previously captured image (e.g., image 401), and the eye shift distance x is determined by comparing the previously captured image with an updated image (e.g., image 402). In some embodiments, the reference position of the surface feature is an eye position corresponding to the axes of a coordinate system describing eye positions, and the eye shift distance x represents a displacement of the surface feature in the updated eye position relative to the surface feature's location in the reference position. In this case, the eye shift distance x may be determined from a single image (e.g., by matching image 402 to a stored image including a position of the surface feature at an eye shift distance x from the reference position of the surface feature).

Based on calibration parameters, the eye tracking module 165 retrieves a radius R of the eye 245. The radius R may be a local radius associated with point A' or with reference point A. Based on the radius R, the eye tracking module 165 determines an eye movement angle θ, which denotes an angular displacement of the updated eye position relative to the reference position in the plane of the cross-section, according to the equation θ=x/R.

Gaze point B' represents a focus of the user's vision at the updated eye position determined from a captured image. The user has a line of sight 410 toward gaze point B' on the electronic display 115 through the pupil within the cornea 255. Reference gaze point B represents a focus of the user's vision on the electronic display 115 when the eye is at the reference position. For example, reference gaze point B is a focus of the user's vision during calibration, when the surface feature was oriented at reference point A, or a focus of the user's vision when a previous image was captured when the eye of the user was positioned so the surface feature was oriented at reference point A. When the eye is at the reference position, the user has a reference line of sight 405 toward reference gaze point B on the electronic display 115. The angle between line of sight 405 and line of sight 410 is equal to the eye movement angle θ.

The eye tracking module 165 determines the gaze position y of gaze point B' relative to reference gaze point B based on the relative orientation between the eye and the electronic display 115. In the simplified drawing shown in FIG. 4B, the eye tracking module 165 obtains a distance D between the eye's axis of rotation and electronic display 115 along a line 415 that is orthogonal relative to the electronic display 115.

Based on angle α between reference line of sight 405 and line 415, which is determined from calibration parameters, the eye tracking module determines the gaze position as y=D·tan(α)−D·tan(α−θ). Because the axis of orientation of the eye may change as the eye moves, the eye tracking module 165 may dynamically determine distance D, angle α, and the position of line 415 based at least in part on a recently determined eye position.

Eye Tracking

Figure 5:
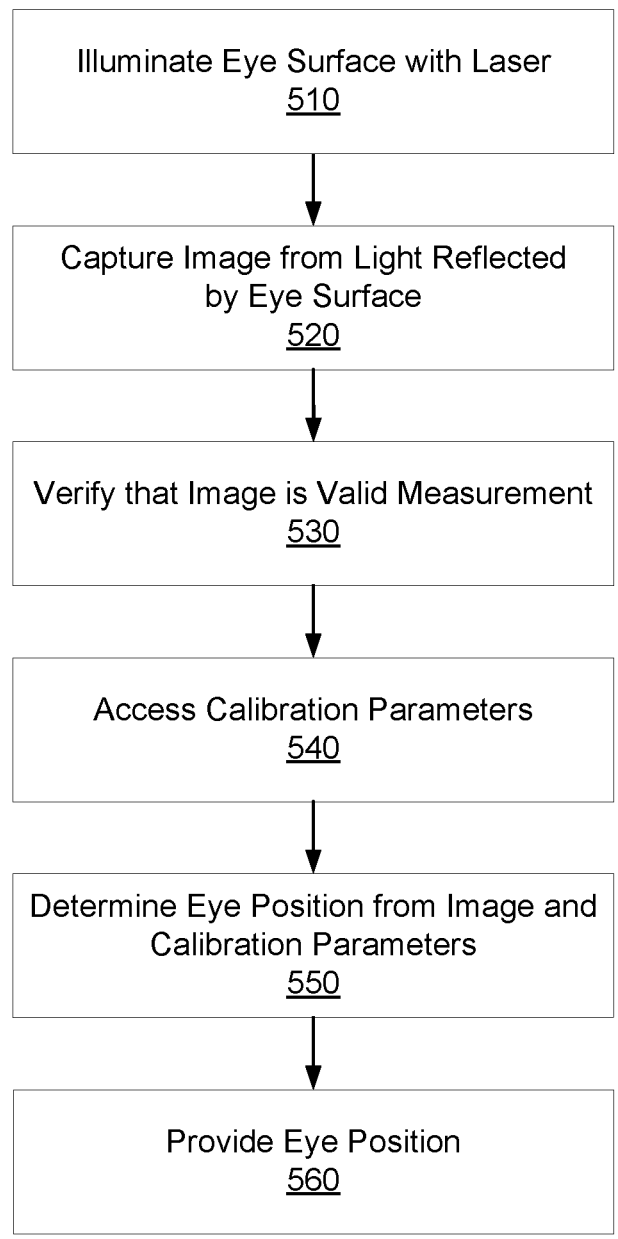
FIG. 5 is a flowchart of an example process for determining eye position, in accordance with an embodiment.

FIG. 5 is a flowchart of one embodiment of a process for determining eye position. In some embodiments, the method may include different and/or additional steps than those described in conjunction with FIG. 5. Additionally, in some embodiments, the method may perform the steps in different orders than the order described in conjunction with FIG. 5.

The VR headset 105 illuminates 510 the eye surface 250 with a coherent light source mounted to (e.g., inside) the VR headset 105, such as laser 260. In various embodiments, the coherent light source is included in an eye tracking unit 160 in the VR headset 105. As described above in conjunction with FIGS. 3A and 3B, light illuminating 510 the eye surface 250 may be collimated by a collimating lens 310, polarized by an incident light polarizer 340, or both.

An imaging device, such as a camera 270, included in an eye tracking unit 160 of a VR headset 105 captures 520 light reflected by the eye surface 250. In some embodiments, light reflected from the eye surface 250 may be polarized by a reflective light polarizer 350 or refracted by a lens assembly 320 that focuses or otherwise modifies light reflected from the eye surface 250 before an imaging sensor 330 in the imaging device receives the light reflected from the eye surface 250. As the eye surface 250 is rough, light captured 520 by the imaging sensor 330 of the imaging device may be a speckle or diffraction pattern formed from a combination of light reflected from multiple portions of the eye surface 250.

In some embodiments, the VR headset 105 performs one or more image processing operations to improve the contrast of an image generated from the light captured 520 by the imaging device. Example image processing operations include sensor corrections (e.g., black-level adjustment, lens distortion correction, gamma correction) and illumination level corrections (e.g., white balance correction). The VR headset 105 may also perform histogram equalization or any other technique to increase the contrast of the image from the captured light. In some embodiments, the VR headset 105 may perform illumination level corrections to reduce noise caused by variable illumination of the eye surface 250 by the electronic display 115 or by an external light source. Although the camera 270 typically captures images in a single color corresponding to the wavelength of the coherent light source, the VR headset 105 may apply color corrections (e.g., debayering, color space conversion to a luminance-chroma space) in embodiments where the camera 270 captures images in multiple colors. Alternatively or additionally, the VR console 110 performs one or more image processing operations on images obtained by the imaging device in the VR headset 105 and communicated from the VR headset 105 to the VR console 110.

The VR headset 105 sends eye tracking data comprising an image captured by the imaging device from the captured light or data derived from the captured image to the VR console 110. For example, the eye tracking data includes a version of the captured image modified through one or more image processing operations. As another example, the eye tracking data includes an image captured by the eye tracking unit 160 and data describing lighting of the eye surface 250 by sources other than the coherent light source of the eye tracking unit 160. In embodiments where the VR headset 105 performs functionality associated with the eye tracking module 165, the eye tracking data is not communicated to the VR console 110.

The eye tracking module 165 verifies 530 that the received eye tracking data corresponds to a valid measurement usable to accurately determine eye position. For example, the eye tracking module 165 determines a representative figure of merit of the eye tracking data and compares the representative figure of merit to a validity threshold. If the representative figure of merit is less than the validity threshold, the eye tracking module 165 determines the received eye tracking data is invalid. However, if the representative figure of merit equals or exceeds the validity threshold, the eye tracking module 165 verifies 530 the received eye tracking data corresponds to a valid measurement. The representative figure of merit may be a sum, an average, a median, a range, a standard deviation, or other quantification of pixel values in image data (e.g., pixel gray levels, luminance values, intensity values). The representative figure of merit may be determined from the figures of merit of all pixels in an image included in the received eye tracking data or estimated from a subset of pixels in the image included in the received eye tracking data by sampling techniques. In some embodiments, the eye tracking module 165 determines a relative intensity of various pixels in an image, determines a sum of the relative intensities, and compares the sum to a validity threshold. For example, when a user blinks, a sum of the relative pixel intensities decreases, so the eye tracking module 165 determines that the received eye tracking data is invalid in response to determining a sum of relative pixel intensity values (or other representative value) is less than the validity threshold. In various embodiments, the validity threshold is specified during manufacture of the VR headset 105 or determined during calibration of the VR headset 105. To account for varying external illumination conditions when verifying 530 the validity of the received eye tracking data, the validity threshold may be dynamically determined based on a trailing average of representative figures of merit or combinations of relative intensities of pixels of previously received eye tracking data that was captured within a threshold time of the received eye tracking data or a trailing average of representative figures of merit or of relative intensities of pixels of previously received eye tracking data that was captured within the threshold time of the received eye tracking data and was determined to be valid. In various embodiments, the trailing average is applied as a finite impulse response (FIR) filter, or similarly otherwise numerically filtered to receive a controlled response in time or frequency, such as with an infinite impulse response (IIR) or a FIR filter. In other embodiments, the trailing average may be applied as any FIR filter capable of being tuned for a specified response or may alternatively be applied using any other suitable filter.

The eye tracking module 165 accesses 540 calibration data for determining an eye position from the received eye tracking data. The calibration data may include a subpixel distance value indicating a distance on the eye surface 250 corresponding to a subpixel of the image sensor 330 of the eye tracking unit 160. If a subpixel of the image sensor 330 corresponds to a rectangular (or elliptical) area on the eye surface 250, the calibration data may include two subpixel distance values corresponding to orthogonal directions along the eye surface 250 (e.g., a length and a width of an area on the eye surface 250). The subpixel distance value may be determined in part from a distance between the image sensor 330 (or a lens assembly 320) and the eye surface 250. The distance between the image sensor 330 and the eye surface 250 may be determined during a calibration period or dynamically determined via a range finding device included in the VR headset 105 (e.g., a laser rangefinder, sonar). In various embodiments, the VR headset 105 periodically determines the distance between the image sensor 330 and the eye surface 250 (e.g., once per second), determines the distance between the image sensor 330 and the eye surface 250 in response to the VR headset 105 powering on, or the distance between the image sensor 330 and the eye surface 250 in response to receiving measurement signals from the position sensor 125 indicating an adjustment of the VR headset 105 on the user's head. The subpixel distance value may be determined by multiplying an angle, in radians, corresponding to a subpixel, which is a property of the camera 230 or the lens assembly 320, by the distance between the image sensor 330 and the eye surface 250. Using the subpixel distance value, the eye tracking module 165 determines a change in eye position from a subpixel shift between two images of the eye surface 250 from received eye tracking data.

Alternatively or additionally, the eye tracking module 165 accesses 540 calibration data from a table (e.g., a lookup table) comprising reference images captured during a calibration period. The reference images correspond to known eye positions, particular eye gaze points on the electronic display 115, or both. During an example calibration period, the VR headset 105 instructs the user to gaze at a series of icons on the electronic display 115 and captures a reference image when the user gazes at each icon. The reference image corresponds to the eye gaze point of the icon at the time of capture, and the eye tracking module 165 infers an eye position corresponding to the reference image from a model of the eye and other eye tracking systems included in the eye tracking unit 160. The eye tracking module 165 may store the reference images or may store a condensed representation of the reference image to facilitate matching with subsequent images from received eye tracking data. For example, the eye tracking module 165 generates a fingerprint for each reference image, extracts features (e.g., blobs, edges, ridges, corners) from each reference image, or both. An extracted feature may be stored in association with information identifying the feature's position on the eye surface 250, values of the feature's constituent pixels, or both. Using the reference images (or condensed representations thereof), the eye tracking module 165 may determine an eye position with reference to a single image from the received eye tracking data.

Using the accessed calibration data, the eye tracking module 165 determines 550 an eye position from the received eye tracking data. In some embodiments, the eye tracking module 165 obtains a reference image associated with a reference eye position. For example, camera 270 captures the reference image at the same time another eye tracking system in the eye tracking unit 160 (e.g., a slow eye tracking system) independently determines the reference eye position. The eye tracking module 165 determines 550 an updated eye position by determining a subpixel shift between an updated image and the reference image, determining an eye shift distance from the subpixel shift, and combining the reference eye position with the eye shift distance. To determine the subpixel shift, the eye tracking module 165 may use any motion tracking or optical flow technique (e.g., phase correlation, block matching, differential optical flow methods). The eye tracking module 165 determines the eye shift distance by multiplying the determined subpixel shift by the subpixel distance value from the accessed calibration data. The subpixel shift may be two-dimensional (e.g., 5 pixels up, 3 pixels left), so the eye shift distance may be two dimensional as well (e.g., 50 micrometers up, 30 micrometers left). Using the eye shift distance, the eye tracking module 165 determines 550 the updated eye position by shifting the reference eye position by the eye shift distance. When determining 550 the updated eye position, the eye tracking module 165 may: update the eye's orientation and location, determine updated axes of eye rotation, determine a new gaze location on the electronic display 115 (as described in further detail with respect to FIG. 4B), or a combination thereof.

Alternatively or additionally, the eye tracking module 165 determines 550 the eye position by matching an updated image with a reference image from accessed calibration data. The eye tracking module 165 compares the eye tracking module 165 to various reference images to determine a matching reference image. The eye tracking module 165 may determine the matching reference image by scoring reference images based on a degree of matching the updated image and selecting a reference image with the highest score. Alternatively or additionally, the reference images are compared to the updated image and scored until a reference image having a score exceeding a threshold value is identified. If the camera 270 captures an image corresponding to 1 square millimeter of the eye, the calibration data includes about 500 images corresponding to different portions of the eye surface 250 capable of being imaged over the eye's full range of motion. In some embodiments, the eye tracking module 165 generates a condensed representation of the updated image (e.g., a fingerprint, a set of features), and compares the condensed representation of the updated image to condensed representations of the reference images to reduce time and computation resources for determining the matching reference image. When the eye tracking module 165 determines the matching reference image, the eye tracking module 165 determines the updated position by adjusting the reference position associated with the matching reference image by a subpixel shift between the updated image and the reference image.

The eye tracking module 165 provides 560 the determined eye position to other components of the VR console 110. For example, the eye tracking module 165 provides 560 the estimated gaze point included in the determined eye position to the VR engine 155, which uses the gaze point as an input to a virtual world. Based on the gaze point, the VR engine 155 may select content for presentation to the user (e.g., selects a virtual anime creature corresponding to the gaze point for deployment against another virtual anime creature in a virtual gladiatorial contest, navigates a virtual menu, selects a type of sports ball to play in the virtual world, or selects a notorious sports ball player to join a fantasy sports ball team).

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
    a headset including:
        a light source configured to emit light directed towards an eye of a user of the headset,
        a camera configured to capture a raster image of light from the light source reflected by a portion of the eye, the camera comprising one or more pixels each configured to capture light from the light source reflected the eye of the user of the headset; and
    a console coupled to the headset and configured to:
        store calibration data indicating a distance on a surface of the portion of the eye of the user corresponding to a pixel of an image sensor included in the camera and one or more previously captured images of light from the light source reflected by the portion of the eye of the user; and
        determine an eye position of the eye of the user based on the captured image of light from the coherent light source reflected by the portion of the eye and stored calibration data, wherein determine the position of the eye of the user based on the captured image of light from the coherent light source reflected by the portion of the eye and stored calibration data comprises:
            extract surface features from the captured image of light from the light source reflected by the portion of the eye;
            compare the extracted surface features to additional surface features extracted from at least a set of the one or more previously captured images of light from the light source reflected by the portion of the eye of the user;
            select previously captured image of light from the coherent light source reflected by the portion of the eye of the user associated with a reference eye position based on the comparison;
            determine a subpixel shift between the surface feature of the captured image of light from the light source reflected by the portion of the eye of the user and the surface feature of the selected previously captured image of light from the coherent light source reflected by the portion of the eye; and
            determine a position of the eye of the user as a product of the subpixel shift and the subpixel distance.

2. The system of claim 1, wherein the surface feature comprises an optical flow pattern associated with a particular portion of a surface of the portion of the eye of the user.

3. A system comprising:
    a headset including:
        a light source configured to emit light directed towards an eye of a user of the headset,
        a camera configured to capture a raster image of light from the light source reflected by a portion of the eye, the camera comprising one or more pixels each configured to capture light from the light source reflected the eye of the user of the headset; and
    a console coupled to the headset and configured to:
        store calibration data indicating a distance on a surface of the portion of the eye of the user corresponding to a pixel of an image sensor included in the camera and one or more previously captured images of light from the light source reflected by the portion of the eye of the user; and
        determine an eye position of the eye of the user based on the captured image of light from the coherent light source reflected by the portion of the eye and stored calibration data, wherein determine the position of the eye of the user based on the captured image of light from the light source reflected by the portion of the eye and stored calibration data comprises:
            determine a subpixel shift between the captured image of light from the coherent light source reflected by the portion of the eye of the user and a previously captured image of light from the light source reflected by the portion of the eye of the user; and
            determine a position of the eye of the user corresponding to the captured image of light from the light source relative to a position of the eye of the user corresponding to the previously captured image of light from the coherent light source reflected by the portion of the eye of the user as a product of the subpixel shift and the subpixel distance.

4. A method comprising:
illuminating a portion of an eye of a user with a light source mounted inside a headset;
capturing an image of light from the light source reflected by a portion of the eye with a camera mounted inside the headset;
determining a position and an orientation of the eye of the user based on the captured image of light from the light source reflected by the portion of the eye and stored calibration data including a subpixel distance indicating a distance on a surface of the portion of the eye of the user corresponding to a subpixel of an image sensor included in the camera and one or more previously captured images of light from the light source reflected by the portion of the eye of the user, wherein determining the position of the eye of the user based on the captured image of light from the coherent light source reflected by the portion of the eye and stored calibration data comprises:
  determining a subpixel shift between the captured image of light from the coherent light source reflected by the portion of the eye of the user and a previously captured image of light from the light source reflected by the portion of the eye of the user; and
  determining a position of the eye of the user corresponding to the captured image of light from the light source relative to a position of the eye of the user corresponding to the previously captured image of light from the coherent light source reflected by the portion of the eye of the user as a product of the subpixel shift and the subpixel distance; and
  providing the position and the orientation of the eye of the user to one or more components of a system environment configured to provide content to the headset based on the determined eye position.

5. A method comprising:
illuminating a portion of an eye of a user with a light source mounted inside a headset;
capturing an image of light from the light source reflected by a portion of the eye with a camera mounted inside the headset;
determining a position and an orientation of the eye of the user based on the captured image of light from the light source reflected by the portion of the eye and stored calibration data including a subpixel distance indicating a distance on a surface of the portion of the eye of the user corresponding to a subpixel of an image sensor included in the camera and one or more previously captured images of light from the light source reflected by the portion of the eye of the user, wherein determining the position of the eye of the user based on the captured image of light from the light source reflected by the portion of the eye and stored calibration data comprises:
  extracting surface features from the captured image of light from the light source reflected by the portion of the eye;
  comparing the extracted surface features to additional surface features extracted from at least a set of the one or more previously captured images of light from the light source reflected by the portion of the eye of the user;
  selecting a previously captured image of light from the coherent light source reflected by the portion of the eye of the user associated with a reference eye position based on the comparison;
  determining a subpixel shift between the surface feature of the captured image of light from the light source reflected by the portion of the eye of the user and the surface feature of the selected previously captured image of light from the coherent light source reflected by the portion of the eye; and
  determining a position of the eye of the user as a product of the subpixel shift and the subpixel distance; and
  providing the position and the orientation of the eye of the user to one or more components of a system environment configured to provide content to the headset based on the determined eye position.

6. The method of claim 5, wherein the surface feature comprises an optical flow pattern associated with a particular portion of a surface of the portion of the eye of the user.

7. A system comprising:
a headset including:
  a light source configured to emit light directed towards an eye of a user of the headset,
  a camera configured to capture a raster image of light from the light source reflected by a portion of the eye, the camera comprising one or more pixels each configured to capture light from the light source reflected the eye of the user of the headset; and
a console coupled to the headset and configured to:
  store calibration data indicating a distance on a surface of the portion of the eye of the user corresponding to a pixel of an image sensor included in the camera and one or more previously captured images of light from the light source reflected by the portion of the eye of the user; and
  determine an eye position of the eye of the user based on the captured image of light from the coherent light source reflected by the portion of the eye and stored calibration data, wherein determine the position of the eye of the user based on the captured image of light from the light source reflected by the portion of the eye and stored calibration data comprises:
    determine a representative figure of merit of the captured image of light from the coherent light source reflected by the portion of the eye;
    compare the representative figure of merit to a validity threshold;
    access the stored calibration data in response to determining the representative figure of merit equals or exceeds the validity threshold; and
    determine the eye position of the eye of the user based on the captured image of light from the light source reflected by the portion of the eye and the stored calibration data.

8. The system of claim 7, wherein the console is further configured to provide content to the headset based on the determined eye position.

9. The system of claim 7, wherein the representative figure of merit is based on figures of merit of a subset of pixels in the captured image of light from the light source reflected by the portion of the eye and the stored calibration data.

10. The system of claim 7, wherein the representative figure of merit is based on figures of merit of all pixels in the captured image of light from the light source reflected by the portion of the eye and the stored calibration data.

11. The system of claim 7, wherein, the validity threshold comprises a trailing average of figures of merit values of additional images of light from the light source reflected by the portion of the eye previously captured within a threshold time of a time when the captured image of light from the light source reflected by the portion of the eye was captured.

12. The system of claim 7, wherein the light source is a coherent light source and the headset further includes:
a reflected light polarizer configured to modify light from the coherent light source that is reflected by the portion of the eye of the user prior to a pixel of the camera capturing the modified light.

13. The system of claim 12, wherein the reflected light polarizer includes a quarter-wave plate.

14. The system of claim 13, wherein the reflected light polarizer comprises a liquid crystal element configured to alter a polarization state of light from the coherent light source that is reflected by the portion of the eye of the user according to an electric field applied to the liquid crystal element to modify orientation of liquid crystals in the liquid crystal element.

15. A method comprising:
illuminating a portion of an eye of a user with a light source mounted inside a headset;
capturing an image of light from the light source reflected by a portion of the eye with a camera mounted inside the headset;
determining a position and an orientation of the eye of the user based on the captured image of light from the light source reflected by the portion of the eye and stored calibration data including a subpixel distance indicating a distance on a surface of the portion of the eye of the user corresponding to a subpixel of an image sensor included in the camera and one or more previously captured images of light from the light source reflected by the portion of the eye of the user, wherein determining the position of the eye of the user based on the captured image of light from the light source reflected by the portion of the eye and stored calibration data comprises:
determining a representative figure of merit of the captured image of light from the light source reflected by the portion of the eye;
comparing the representative figure of merit to a validity threshold;
accessing the stored calibration data in response to determining the representative figure of merit equals or exceeds the validity threshold; and
determining the eye position of the eye of the user based on the captured image of light from the light source reflected by the portion of the eye and the stored calibration data; and
providing the position and the orientation of the eye of the user to one or more components of a system environment configured to provide content to the headset based on the determined eye position.

16. The method of claim 15, wherein the representative figure of merit is based on figures of merit of a subset of pixels in the captured image of light from the light source reflected by the portion of the eye and the stored calibration data.

17. The method of claim 15, wherein the representative figure of merit is based on figures of merit of all pixels in the captured image of light reflected by the portion of the eye from the light source, and the stored calibration data.

18. The method of claim 15, wherein, the validity threshold comprises a trailing average of figures of merit of additional images of light from the light source reflected by the portion of the eye previously captured within a threshold time of a time when the captured image of light from the light source reflected by the portion of the eye was captured.

* * * * *